United States Patent [19]

Witzke et al.

[11] 4,162,294

[45] Jul. 24, 1979

[54] PROCESS FOR WORKING UP NONFERROUS METAL HYDROXIDE SLUDGE WASTE

[75] Inventors: Lothar Witzke, Brühl; Wolfgang Müller, Mannheim-Rheinau, both of Fed. Rep. of Germany

[73] Assignee: Th. Goldschmidt AG, Essen, Fed. Rep. of Germany

[21] Appl. No.: 945,846

[22] Filed: Sep. 26, 1978

[30] Foreign Application Priority Data

Sep. 29, 1977 [DE] Fed. Rep. of Germany ....... 2743812

[51] Int. Cl.$^2$ ..................... C01G 3/10; C01G 37/14; C01G 9/00; C01G 53/10

[52] U.S. Cl. .................................. 423/24; 423/41; 423/55; 423/57; 423/61; 423/100; 423/109; 423/127; 423/128; 423/139; 423/150

[58] Field of Search ..................... 423/24, 41, 53, 57, 423/61, 100, 109, 128, 131, 132, 139, 150

[56] References Cited

U.S. PATENT DOCUMENTS

| | | | |
|---|---|---|---|
| 2,775,517 | 12/1956 | Mancke | 423/61 |
| 3,966,569 | 6/1976 | Reinhardt et al. | 423/139 |
| 4,029,733 | 6/1977 | Faugeras et al. | 423/139 |
| 4,105,743 | 8/1978 | Reinhardt et al. | 423/24 |
| 4,124,462 | 11/1978 | Reinhardt et al. | 423/100 |

OTHER PUBLICATIONS

Reinhardt, H., "Solvent Extraction for Recovery of Metal Waste" *Chemistry and Industry,* Mar. 1, 1975, pp. 210–213.

*Primary Examiner*—Brian Hearn
*Attorney, Agent, or Firm*—Toren, McGeady and Stanger

[57] ABSTRACT

A method for treating nonferrous metal hydroxide sludge waste to separate and recover the nonferrous metals therein wherein the waste is first mixed with an alkali hydroxide or carbonate, dried, and then roasted and the water-insoluble residue in the roasted material is treated with sulfuric acid to produce an acid-insoluble residue and a sulfuric acid solution containing copper, aluminum and chromium and thereafter, separating the copper from this solution by liquid-liquid extraction and thereafter, separating the aluminium, chromium, zinc and nickel from the remaining solution by separate liquid-liquid extraction steps.

6 Claims, No Drawings

PROCESS FOR WORKING UP NONFERROUS METAL HYDROXIDE SLUDGE WASTE

BACKGROUND OF THE INVENTION

1. Field of the Invention

The invention relates to a process for treating nonferrous metal hydroxide sludge waste containing chromium, copper, zinc, and nickel as nonferrous metals and recovering the nonferrous metals by separating the individual nonferrous metals from one another.

2. Description of the Prior Art

Hydroxide sludge waste obtained from galvanic processes or in the nonferrous metal processing industry generally contains the following components (data in weight %):

| | | |
|---|---|---|
| Water | 40 to 90, on the average | 70 |
| Iron | 0 to 10, on the average | 2 |
| Aluminum | 0 to 2, on the average | 0.5 |
| Chromium(III) | 0 to 10, on the average | 2 |
| Zinc | 0 to 10, on the average | 2 |
| Copper | 0 to 5, on the average | 1 |
| Nickel | 0 to 5, on the average | 1 |
| Calcium | 0 to 20, on the average | 4 |
| Sodium | 0 to 2, on the average | 0.5 |
| Silicic acid | 0 to 5, on the average | 1 |
| Cyanide (complex) | 0 to 0.1 | — | — |
| Sulfite | + | — | — |
| Carbonate | 0 to 5 | — | — |
| Chloride | + | — | — |
| Sulfate | — | — | — |

This hydroxide sludge waste has too high a water content and too low a concentration of valuable metals to allow an economic smelting process to be carried out. As a waste material, however, it contaminates the environment and must be disposed of only on special garbage dumps, which is very expensive. For this reason, clean removal or destruction of the waste is necessary. However, working up of the waste with recovery of the contents is highly desirable.

It has already been proposed that such waste be disposed of by admixing it in the manufacture of bricks. Furthermore, process methods are known from hydrometallurgy and from wastewater treatment, which permit the recovery of one or two components, although even those processes have proven unsatisfactory. None of the processes allows the recovery of several of the components satisfactorily.

Moreover, there are numerous processes for separating out metals in fixed-bed ion exchangers or for removing them from effluent waste solutions. By means of these processes, a selective separation of valuable nonferrous metals is not achieved. Generally, mixed solutions are obtained, which are precipitated together and the resulting residue must then be disposed of as waste sludge.

A process for the recovery of copper and zinc from nonferrous metal scrap is disclosed in German Offenlegungsschrift No. 23 40 399. According to this process, the sludge is leached with an ammonium carbonate solution in the presence of oxygen. Subsequently, the metals are separated from the leaching solutions containing copper ammonium carbonate or zinc ammonium carbonate. Such a process cannot be used for working up nonferrous metal hydroxide sludge waste, since the calcium content inferferes with the ammonium carbonate equilibrium and since, in addition, the chromium hydroxide would remain in the residue.

The recovery of copper and nickel by liquid-liquid extraction from ammoniacal solutions is known, as is the liquid-liquid extraction of copper at pH values of 1 to 3. These processes work in conjunction with an electrolysis treatment whose terminal electrolyte is used for stripping the metal-laden organic phase. Furthermore, there are processes for extracting zinc with organic liquids from zinc-containing sulfuric acid solutions and stripping this zinc with the terminal electrolytes of an electrolysis. It is common to all of these extraction processes described that the separation can only be carried out in the absence of iron, calcium, aluminum and chromium impurities.

Attempts to selectively precipitate the nonferrous metal compounds from the waste sludge have failed because of the co-precipitation of considerable amounts of impurities.

SUMMARY OF THE INVENTION

We have discovered a method for economically separating off the individual nonferrous metals, such as, chromium, copper, zinc and nickel from such wastes simultaneously and in a mostly continuous process from the collected nonferrous metal hydroxide waste. This is achieved by the combination of the following process steps which are to be carried out consecutively:

(a) mixing alkali hydroxide and/or alkali carbonate with the nonferrous metal sludge waste in at least stoichiometric amounts based on the chromium content of the sludge waste, drying the mixture at temperatures less than 200° C. and roasting the dried mass in a current of air at temperatures of 400° to 800° C. for 0.5 to 3 hours, subsequently adding the hot roasted material to water, separating off the alkali chromate formed and washing the water-insoluble residue, (b) treating the aforementioned residue with 10 to 20 weight percent of sulfuric acid at pH values not greater than 2 and at temperatures of 50° to 100° C. for 0.5 to 5 hours, and separating off the acid-insoluble residue from the sulfuric acid solution obtained, (c) separating the copper from this solution by liquid-liquid extraction by conventional procedures and working up the copper-free solution by (1) precipitating and separating the remaining aluminum and chromium(III) at pH values of 4 to 6 as hydroxides or basic sulfates, (2) separating the zinc from the remaining solution by liquid-liquid extraction, and (3) separating the nickel from the remaining solution by liquid-liquid extraction and working up the individual nonferrous metal fractions, obtained by process steps (c), (1), (2) and (3) by conventional procedures.

DESCRIPTION OF THE PREFERRED EMBODIMENTS

By this combination of process steps, conversion of trivalent chromium to the hexavalent state is achieved. This provides the opportunity for separating the alkali chromate through aqueous leaching, before the soluble sulfates of copper, zinc and nickel are formed. These sulfates are formed by the subsequent sulfuric acid treatment for the purpose of separating these salts from the insoluble residue which contains the interfering components, such as, calcium sulfate, basic iron sulfate and especially silicic acid. Of course, the usual oxidizing agents, such as, hydrogen peroxide, potassium permanganate, chlorine, etc., may also be used for converting the trivalent chromium into the selectively separatable hexavalent form. However, oxidation by roasting in air has proven to be the most economic method.

The subsequent recovery of chromium in the hexavalent form by aqueous leaching in the first process step is advantageous because any chromium remaining in the trivalent form prevents acidic upgrading because it interferes with the liquid-liquid extraction of zinc and nickel.

Through the aqueous and acidic leaching of roasted nonferrous metal and the subsequent filtration of the suspensions obtained, rates of filtration are achieved which are 20 times higher than those obtained when suspensions of sludge which have not been roasted are filtered. By the liquid-liquid extraction of copper and zinc, which has previously not been known in this consecutive process combination and by the precipitation of aluminum as the hydroxide, a nickel salt solution is finally obtained in the last process step by liquid-liquid extraction. A significant feature of the individual process steps is the timely separation of interfering impurities, such as, calcium, iron, silicon and aluminum.

Alkali hydroxides, preferably in aqueous, concentrated solutions, are added to the moist nonferrous metal hydroxide sludge which may contain 60 to 70% of water. For economic reasons, sodium hydroxide is preferably used. Sodium carbonate in solid form may also be mixed in with the waste sludge. Alkali hydroxide may also be formed in situ, for example, from calcium hydroxide and alkali sulfate. The mixing in of the alkali hydroxides or alkali carbonates should take place in stoichiometric amounts based on the chromium content of the sludge waste. However, a 2- to 4-fold excess has proven to be advantageous.

It is advisable to dry the moist sludge mixture at this point so that the energy required for the following roasting step is not excessive. This drying is carried out at temperatures below 200° C. and may be quite incomplete in order to avoid dust formation which could occur on complete drying.

The pre-dried mass is now subjected for 0.5 to 3 hours to a roasting at temperatures of 400° to 800° C., preferably at 500° to 700° C., while air is supplied at the same time. By these means, the trivalent portions of chromium are oxidized to the hexavalent state. At the same time, divalent iron is oxidized to trivalent iron, sulfite to sulfate and cyanide to cyanate, and organic components are combusted.

The temperature must be controlled carefully in the roasting. If the temperatures are too low, the yield of hexavalent chromium decreases. Excessively high temperatures lead to spinel formations which, in turn, make it more difficult to leach the nonferrous metals which are to be recovered.

The oven-hot roasted material is then added to water and leached for one to two hours with stirring at temperatures of 70° to 100° C. Subsequently, the warm suspension is filtered, for example, with a vacuum filter. Filtration rates of 1000 to 1500 $l/m^2$ per hour are attained without having to add filter aid. The very good filterability of the suspension is due primarily to the relatively crystalline silicic acid which is obtained after roasting. After the usual washing process, a dark-brown moist residue is obtained, which still contains 30 to 40% of water and corresponds quantitatively to about 80 to 90% of the roasted material, which was leached.

If alkali is added in a stoichiometric amount, the filtrate obtained on filtering the roasted material, contains the main portion of the chromium in the form of the alkali chromate. The alkali chromate may now be reduced by known procedures with the conventional reducing agents, such as, nascent hydrogen, fomaldehyde, etc., to the trivalent chromium. The precipitated chromium(III) hydroxide is then separated off and used for further working up, for example, to chromium oxide. The alkali hydroxide, formed in this reduction reaction, is now advantageously returned to the cycle of the first process step where it is mixed with fresh waste sludge. The alkali hydroxide, added once here, is retained almost completely because of this reduction reaction. Only losses resulting, for example, from washing, need to be replaced.

As has already been mentioned above, it has proven to be advantageous to mix in the 2- to 4-fold amount of alkali hydroxide and/or alkali carbonate with the waste sludge. Such a procedure has the additional advantage that the aluminum present in the waste sludge is converted to the aluminate during the roasting and is present in the filtrate after leaching with water and separating off the insoluble residue as the alkali aluminate along with the alkali chromate.

After the above-described chromium reduction and the removal of the chromium(III) hydroxide, the aluminum may be precipitated as the aluminum hydroxide, for example, by passing in carbon dioxide, and filtered off. The alkali carbonate which is obtained here can also be returned to the cycle of the first process step. By such means, the separation of a large portion of the aluminum which interferes with the subsequent separation of the nonferrous metals, is achieved already in the first process step.

The water-insoluble residue, which is obtained after leaching with water and subsequent filtration, is now leached for 0.5 to 5 hours with 10 to 20% sulfuric acid at pH values not greater than 2 and at temperatures of 50° to 100° C.

As a result of this treatment with sulfuric acid, sulfates of copper, nickel, zinc and any remaining aluminum are formed. At the same time, iron and calcium are converted to compounds which are sufficiently insoluble for practical purposes. Also, insoluble silicic acid is obtained. By filtration, which also proceeds at a very good rate of about 800 to 1200 $l/m^2$ per hour, the soluble constituents are now separated from the insoluble ones. The insoluble residues which consist mainly of the already mentioned sulfates and of silicic acid may be discarded.

The roasting of sludge, containing metal hydroxides, under a supply of air with the subsequent treatment by sulfuric acid, is superior to the ammoniacal leaching process known in the art. While the ammoniacal leaching for nickel, copper and zinc attains leaching values only between 50 and 90%, this process step leaches out almost 100% of the metals copper, chromium, nickel and zinc.

The sulfuric acid filtrate remaining after the separation of the chromium and after the treatment of the residue with sulfuric acid, is now used for the subsequent liquid-liquid extraction.

Liquid-liquid extraction is defined as the exchange of metal ions or hydrogen ions between two immiscible, liquid phases, one of which is an aqueous phase and the other of which is an organic solvent phase. For the separation of copper by such a liquid-liquid extraction, which now follows, well-known extraction agents are suitable, such as, for example, dilutions of substituted hydroxy-benzophenone oximes with mineral oil. At the same time, the pH of the aqueous phase should be maintained between 1.5 and 2.5. The acidic metal salt solution may contain up to 20 g/l of copper. The presence of elements, such as, zinc, nickel and aluminum, at the same concentration does not interfere. The copper content of the aqueous phase (raffinate) can be lowered to values below 0.01 g/l in three to five consecutive mixer-settler extraction steps, depending on the initial concentration.

The term "mixer-settler" refers to box-like, two-part vessels, in the first part of which, mixing of the inorganic and organic phases takes place, while in the second part of which, the separation of the two phases occurs. Mixing promotes the intimate contact of the liquid phases for the desired material transfer. For this extraction, the organic phase moves countercurrent-wise.

It is advantageous, especially in the case of chloride-containing charge solutions, to wash the copper-containing organic phase with water, a sodium sulfate solution, or a copper sulfate solution as it leaves the extraction steps. Subsequently, the organic phase is stripped in a three-step mixer-settler unit with a diluted sulfuric acid (100 to 200 g $H_2SO_4$/l). A copper sulfate solution, with more than 50 g of copper per liter and less than 0.05 g/l of foreign metals and a regenerated organic phase with traces of copper are obtained. The copper sulfate solution obtained may, for example, be used for the manufacture of cathode copper by a copper electrolysis or for the crystallization of copper sulfate.

After separating out the aluminum, iron, calcium, chromium and copper, the aqueous raffinate contains only possible traces of these elements, as well as the bulk of the zinc and nickel. In order to prepare the solution for the removal of zinc and to separate out trivalent metal ions, the pH of the solution is adjusted to 4 to 6 by the addition of soda and/or lime. After decanting and filtering, the bulk of the zinc and nickel are obtained in the filtrate.

From this solution, which is now free of chromium, aluminum and copper, zinc is separated out by liquid-liquid extraction. For this purpose, the mixer-settler apparatus, which has already been mentioned above, is used. The di-(2-ethylhexyl-)phosphoric acid, diluted with mineral oil, is especially suitable as the extraction agent. After three to five mixer-settler steps, the zinc content in the raffinate is reduced to less than 0.01 g/l. At the same time, the pH of the inorganic aqueous phase added should be maintained at 2 to 3. The organic phase, which may contain 10 to 30 g/l of zinc depending on the di-(2-ethylhexyl-)phosphoric acid content, is stripped in three mixer-settler steps with a 20 to 30% hydrochloric acid solution. The stripping eluate has a zinc concentration in excess of 200 g of zinc per liter and may be used for the manufacture of zinc chloride.

Processes are known for recovering zinc from relatively pure sulfate solutions or effluent water or for extracting zinc as the chloro complex from solutions with a high chloride content. However, it was not previously known that zinc may be extracted along with nickel and sodium from sulfate solutions in such a manner that stripping eluates practically free of heavy metals and with a high zinc content are obtained.

Nickel is now separated out by liquid-liquid extraction from the aqueous solution containing alkali sulfate, which now remains. A mixture of di-2-ethylhexyl-phosphoric acid and naphthenic acid, in conjunction with a high-boiling aromatic solvent, such as, kerosene, has proven to be a suitable extraction agent. Especially suitable is a mixture of 1 to 10 parts by volume of di-2-ethylhexyl-phosphoric acid and 3 to 30 parts by volume of naphthenic acid. Preferred is a mixture of 3 to 7 parts by volume of di-2-ethylhexyl-phosphoric acid and 10 to 20 parts by volume of naphthenic acid with kerosene as solvent.

With the help of this mixture, it is possible to extract nickel from the aqueous, nickel-containing solution with the high alkali content, to a residual nickel content of less than 1 mg/l. For this purpose, two to four extraction steps and a contact time of less than 5 minutes are required in the pH range of 6 to 7.5.

The organic phase, saturated with nickel (10 to 20 l g of Ni/l) is stripped in two mixer-settler steps by concentrated hydrochloric acid or hydrochloric acid containing nickel solution or by diluted sulfuric acid or sulfuric acid containing nickel sulfate solution or by solutions containing nitric acid, in such a manner, that highly concentrated nickel salt solutions are obtained directly. Depending on which stripping acid is used, solutions of nickel chloride, nickel sulfate or nickel nitrate are obtained. These solutions or the salts which can be crystallized from them can be used directly in the galvanizing industry for nickel plating.

By the process conducted in accordance with the present invention, high yields (98.5 to 99.5%) of the valuable nonferrous metals in the hydroxide sludge waste are obtained. Only traces of these elements are contained in the solutions which remain after the process. A further achievement of the roasting and leaching processes and the removal of the nonferrous metal elements associated therewith is the fact that the amount of sludge waste is reduced to a third of the original amount.

The inventive process is explained in greater detail by means of the following examples of its operation.

EXAMPLE 1

100 Parts by weight of a galvanizing sludge mixture containing (in weight %) 68.4 $H_2O$, 1.62 Cr, 1.49 Cu, 1.94 Ni, 1.52 Zn, 0.62 Fe, 0.75 Al, 1.20 $SiO_2$ and 3.82 Ca, were mixed with 6.2 parts by weight of a 50% sodium hydroxide solution. Based on the chromium content, this corresponded to 125% of the theoretically required amount of sodium hydroxide. After drying for 2 hours at 600° C., the mixture was roasted in a ventilated muffle furnace. 26.0 Parts by weight of roasted material were obtained.

By leaching this roasted material for 30 minutes with a total of 100 parts by weight of water at 80° C., 1.19 parts by weight of hexavalent chromium were separated out in the form of a sodium-chromate-containing solution.

Apart from sodium chromate, the solution at a pH of 9 contained only 0.01 parts by weight of aluminum, 0.05 parts by weight of calcium and less than 0.001 parts by weight of each of the metals Cu, Ni, Zn and Fe.

The residue, which had remained undissolved in the water, was treated for 2 hours with 165 parts by weight of a 12% sulfuric acid solution. In so doing, the pH adjusted to a value of 1.5 towards the end of the leaching at 90° C.

The mass of the separated, washed and moist residue was 15.6 parts by weight. The residue contained gypsum, silicic acid, aluminum oxide, iron oxide and basic iron sulfate as the main constituents, as well as 0.05 weight percent of chromium(III), 0.02 weight percent of Cu, 0.01 weight percent of Ni, 0.01 weight percent of Zn and 48% moisture.

When filtering, a very good rate of filtration of 1200 $l/m^2$ per hour was achieved. The residue was discarded. The collected filtrate of the sulfuric acid leach (a total of 240 parts by volume) was supplied to a solvent extraction step for the extraction of copper.

A 20 volume percent solution of benzophenone oxime in kerosene, low in aromatics (less than 0.1%) and boiling in the range of 192° to 254° C., was used as extraction agent. Four mixer-settlers, connected in series and each having a mixing space of 1 liter and a settling space of 4 liters, were used as the extraction apparatus. The flow rate of the organic phase averaged 13.1 l/h and that of the inorganic phase to be extracted 9.5 l/h. The copper concentration of the organic phase reached about 4.5 g/l, while the so-called raffinate, the aqueous phase extracted in 4 steps, contained 0.002 g/l of copper.

Between the second and third steps, the pH of the aqueous phase was adjusted to 2.0 by the addition of sodium hydroxide. For stripping the copper, the copper-containing organic phase was brought into contact with a 140 g/l sulfuric acid solution at 50° C. in three equal, consecutive mixer-settler steps. By so doing, the copper content of the organic phase fell to 0.1 g/l and the copper content of the acid increased to 70 g/l. This so-called stripping eluate contained in addition 0.005 g Ni/l, less than 0.001 g Al/l, 0.001 g Zn/l and 0.02 g Fe/l. After addition of 50% sulfuric acid and cooling, pure $CuSO_4.5H_2O$ crystallized out.

The raffinate solution from the copper extraction contained, along with practically the whole amount of zinc and nickel, entrained amounts of chromium(III), aluminum and iron(III). Before the zinc extraction, these were precipitated by the addition of soda solution to a pH of 5 at 30° C., and filtered off.

To separate out the zinc, the filtrate was treated in four mixer-settler steps (construction as for copper) with an extraction solution of 20 volume percent of di-(2-ethylhexyl-) phosphoric acid in kerosene (aromatics less than 0.1%, boiling point range 192° to 254° C.). The rate of flow of the inorganic phase was 10 l/h and that of the organic phase 8 l/h. Finally, an organic phase containing about 7.9 g Zn/l was obtained.

After the second extraction step, the pH of the aqueous solution was adjusted to 3.0 with sodium hydroxide. In the zinc-free raffinate, 0.01 g Zn/l could still be detected after the fourth step. For stripping the zinc from the organic phase, the latter was treated in three mixer-settler steps with a 30 weight percent solution of hydrochloric acid. The zinc content of the organic phase fell to ca. 0.1 g/l and that of the inorganic phase reached 240 g Zn/l. Nickel and sulfate could no longer be detected in the zinc stripping eluate.

The copper raffinate of the zinc extraction which still contained nickel sulfate and sodium sulfate, was supplied to a third solvent extraction step, also at the rate of 10 l/h for separating out the nickel. As for the preceding metals, this solvent extraction consisted of four steps.

A mixture of 5 volume percent of di-(2-ethylhexyl-) phosphoric acid and 15 volume percent of naphthenic acid in a kerosene with a boiling point range of 192° to 254° C. was used as extraction agent. The pH of each step was kept at 6.5 by the addition of sodium hydroxide. The rate of flow of the organic phase was ca. 4.2 l/h. After three steps, the nickel content of the organic phase adjusted to 19.3 g/l, while the nickel raffinate contained less than 0.01 g/l of nickel and of the sodium sulfate formed in the extraction. In order to recover the nickel, the nickel-laden organic phase was stripped with 20 weight percent nitric acid solution also in three mixer-settler steps. A 39 weight percent nickel nitrate solution was obtained.

EXAMPLE 2

100 Parts by weight of a galvanizing sludge mixture, having the same composition as that given in Example 1, were mixed with 9.0 parts by weight of a 50% sodium hydroxide solution. Based on the chromium content, this corresponded to 182% of the theoretically required amount of sodium hydroxide.

The mixture was dried as in Example 1 and roasted for 2 hours at 600° C. while exposed to the action of air. 27.5 Parts by weight of roasted material were obtained. During the 30 minutes of aqueous leaching of the roasted material at 80° C., 1.47 parts by weight of chromium, as sodium chromate, and 0.50 parts by weight of aluminum were obtained.

Apart from sodium chromate and sodium aluminate, this solution contained at a pH greater than 10, 0.01 parts by weight of zinc and 0.05 parts by weight of calcium as well as less than 0.001 parts by weight of each of the metals Cu, Ni, and Fe. In order to recover the metal compounds of Cu, Zn and Ni, the water-insoluble residue was worked up further as described in Example 1.

The sodium-chromate-containing solution was treated at 80° C. by the addition of 3 parts by weight of a 30% formalin solution as reducing agent. At the same time, a readily filterable chromium hydroxide was formed as well as a solution, as filtrate, which contained especially sodium aluminate, sodium hydroxide and sodium carbonate. By passing in carbon dioxide, the pH was lowered to 9 and all of the aluminum was precipitated as aluminum hydroxide. After filtration, the solution, which now contained only sodium carbonate and sodium bicarbonate, could advantageously be used as alkali addition for mixing in before the roasting, since it contained practically the same amount of alkali as is added, in the form of sodium hydroxide, in accordance with the above-mentioned amount.

After washing the precipitated chromium hydroxide and calcining it at 800° C., 2.1 parts by weight of a practically pure chromium oxide were obtained.

What is claimed is:

1. A process for treating nonferrous metal hydroxide sludge waste which contains chromium, aluminum, copper, zinc, and nickel as nonferrous metals and recovering and separating the nonferrous metals by the consecutive steps of:
   (a) mixing an alkali hydroxide or alkali carbonate with the nonferrous metal sludge waste in at least stoichiometric amounts, based on the chromium content of the waste sludge, drying the mixture at temperatures of less than 200° C. and roasting the dried mass in a current of air at temperatures of 400° to 800° C. for 0.5 to 3 hours, subsequently adding the hot roasted material to water, separating off the alkali chromate formed and washing the water-insoluble residue;

(b) treating the residue from step (a) with 10 to 20 weight percent of sulfuric acid at pH values not greater than 2 and at temperatures of 50° to 100° C. for 0.5 to 5 hours, and separating off the acid-insoluble residue from the sulfuric acid solution obtained;

(c) separating the copper from this solution by liquid-liquid extraction and working up the copper-free solution by:

(1) precipitating and separating the remaining aluminum and chromium(III) portions at pH values of 4 to 6 as hydroxides or basic sulfates and then (2) separating the zinc from the remaining solution by liquid-liquid extraction; and (3) separating the nickel from the remaining solution by liquid-liquid extraction;

and working up the individual nonferrous metal fractions obtained from steps (c), and (c1), (c2), and (c3) by conventional procedures.

2. The process of claim 1 wherein the alkali hydroxide or alkali carbonate is added in a 2- to 4-fold excess, based on the chromium content of the sludge waste.

3. The process of claim 1 wherein dilutions of substituted hydroxy-benzophenone oximes with a mineral oil are used as the extraction agents in step (c).

4. The process of claim 1 wherein di-(2-ethylhexyl-)phosphoric acid diluted with mineral oil is used as extraction agent in step (c2).

5. The process of claim 1 wherein a mixture of di-2-(ethylhexyl-)phosphoric acid and naphthenic acid diluted with kerosene is used as extraction agent in step (c2).

6. The process of claim 5 wherein a mixture of 1 to 10 parts by volume of di-(2-ethylhexyl-)phosphoric acid and 3 to 30 parts by volume of naphthenic acid diluted with kerosene is used as the extraction agent.

* * * * *